US010996089B2

(12) United States Patent
Heim

(10) Patent No.: US 10,996,089 B2
(45) Date of Patent: May 4, 2021

(54) NON-LINEAR ULTRASOUND METHOD AND APPARATUS FOR QUANTITATIVE DETECTION OF MATERIALS (LIQUIDS, GAS, PLASMA)

(71) Applicant: PERCEPTIVE SENSOR TECHNOLOGIES LLC, Tucson, AZ (US)

(72) Inventor: James M. Heim, Tucson, AZ (US)

(73) Assignee: PERCEPTIVE SENSOR TECHNOLOGIES LLC, Tucson, AZ (US)

( * ) Notice: Subject to any disclaimer, the term of this patent is extended or adjusted under 35 U.S.C. 154(b) by 0 days.

(21) Appl. No.: 16/888,469

(22) Filed: May 29, 2020

(65) Prior Publication Data

US 2020/0378812 A1 Dec. 3, 2020

Related U.S. Application Data

(60) Provisional application No. 62/855,514, filed on May 31, 2019.

(51) Int. Cl.
*G01F 1/66* (2006.01)
*G01F 1/688* (2006.01)
*G01F 25/00* (2006.01)

(52) U.S. Cl.
CPC .......... *G01F 1/667* (2013.01); *G01F 1/6882* (2013.01); *G01F 25/0007* (2013.01)

(58) Field of Classification Search
CPC ..... G01F 1/667; G01F 1/6882; G01F 25/0007
See application file for complete search history.

(56) References Cited

U.S. PATENT DOCUMENTS 2,449,054 A * 9/1948 Cantlin .................. 340/624
3,703,829 A * 11/1972 Dougherty ........... B64D 37/005
73/290 R (Continued)

FOREIGN PATENT DOCUMENTS

WO    WO 2007/149605    12/2007

OTHER PUBLICATIONS

Amjad, Umar et al, "Advanced signal processing technique for damage detection in steel tubes" Proceedings of SPIE, Health Monitoring of Structural and Biological Systems 2016, 980511 (Apr. 1, 2016);14 pgs.

(Continued)

*Primary Examiner* — Natalie Huls
(74) *Attorney, Agent, or Firm* — Hayes Soloway P.C.

(57) ABSTRACT

Systems and methods for determining a weight of a quantity of fluid, or a flow rate of the fluid by weight. An acoustic sensor positioned on an exterior wall of a vessel containing the fluid determines a fill level of the fluid. A computerized device calculates a weight of the quantity of fluid using a size of the vessel, the determined fill level, a temperature of the fluid, and the fluid identity and/or a fluid density. Flow rate of the fluid through a pipe is determined using two or more acoustic sensors positioned at different locations on a pipe, and a temperature sensor. A computer calculates a differential time of flight of the fluid based on readings of the acoustic sensor, a distance therebetween, the temperature sensor, the pipe volume, and the fluid identity and/or a fluid density. A flow by weight of the quantity of fluid is determined.

13 Claims, 9 Drawing Sheets

(56) References Cited

U.S. PATENT DOCUMENTS

| | | | |
|---|---|---|---|
| 4,182,177 A | 1/1980 | Prough | 73/290 |
| 4,280,126 A | 7/1981 | White | 340/621 |
| 4,676,098 A | 6/1987 | Erlenkämper et al. | 73/290 |
| 4,934,191 A | 6/1990 | Kroening et al. | 73/592 |
| 5,015,995 A | 5/1991 | Holroyd | 340/621 |
| 5,038,611 A | 8/1991 | Weldon et al. | 73/290 |
| 5,295,120 A | 3/1994 | McShane | 367/188 |
| 5,325,727 A | 7/1994 | Miller et al. | G01F 1/34 |
| 5,415,033 A * | 5/1995 | Maresca, Jr. | G01M 3/2807 73/40.5 R |
| 5,438,868 A | 8/1995 | Holden et al. | 73/290 |
| 5,770,806 A | 6/1998 | Hiismaki | G01F 1/662 |
| 6,157,894 A | 12/2000 | Hess et al. | 702/54 |
| 6,330,831 B1 | 12/2001 | Lynnworth et al. | 73/861.28 |
| 6,470,744 B1 | 10/2002 | Usui et al. | 73/290 |
| 6,631,639 B1 | 10/2003 | Dam et al. | 73/290 |
| 6,925,868 B2 | 8/2005 | Young et al. | 73/290 |
| 6,938,488 B2 * | 9/2005 | Diaz | G01N 29/024 73/52 |
| 7,114,375 B2 | 10/2006 | Panetta et al. | 73/61.75 |
| 7,246,522 B1 * | 7/2007 | Diaz | G01N 29/07 73/52 |
| 7,299,136 B2 | 11/2007 | DiFoggio et al. | 702/22 |
| 7,694,570 B1 | 4/2010 | Dam et al. | 73/644 |
| 7,966,882 B2 | 6/2011 | Greenwood | 73/597 |
| 8,915,145 B1 | 12/2014 | Van Orsdol | G01F 1/74 |
| 10,122,051 B2 | 11/2018 | Kuhne et al. | H01M 10/484 |
| 2004/0079150 A1 | 4/2004 | Breed et al. | 73/291 |
| 2004/0173021 A1 | 9/2004 | Lizon et al. | 73/290 |
| 2005/0055136 A1 | 3/2005 | Hofmann et al. | 700/273 |
| 2005/0178198 A1 | 8/2005 | Freger et al. | 73/290 |
| 2005/0247070 A1 * | 11/2005 | Arshansky | F25B 45/00 62/77 |
| 2006/0196224 A1 * | 9/2006 | Esslinger | F25B 49/005 62/509 |
| 2007/0157737 A1 | 7/2007 | Gysling et al. | G01F 1/667 |
| 2010/0199779 A1 | 8/2010 | Liu et al. | G01F 1/663 |
| 2010/0242593 A1 | 9/2010 | Lagergren et al. | G01F 23/296 |
| 2011/0029262 A1 | 2/2011 | Barkhouse | 702/55 |
| 2011/0120218 A1 | 5/2011 | Aldridge | 73/290 |
| 2011/0284288 A1 | 11/2011 | Sawyer et al. | E21B 49/005 |
| 2012/0259560 A1 | 10/2012 | Woltring et al. | 702/55 |
| 2012/0262472 A1 | 10/2012 | Garr et al. | G06T 11/206 |
| 2013/0080081 A1 | 3/2013 | Dugger et al. | G01F 1/663 |
| 2013/0128035 A1 * | 5/2013 | Johns | G01N 35/0095 348/135 |
| 2014/0223992 A1 * | 8/2014 | Harper | G01F 23/26 73/23.31 |
| 2014/0301902 A1 | 10/2014 | Fernald et al. | B01T 19/10 |
| 2015/0212045 A1 | 7/2015 | Raykhman et al. | G01F 1/74 |
| 2015/0247751 A1 | 9/2015 | Kutlik et al. | G01F 23/2962 |
| 2015/0260003 A1 | 9/2015 | McHugh et al. | E21B 33/076 |
| 2015/0369647 A1 * | 12/2015 | Kumar | G01F 23/2962 705/34 |
| 2016/0025545 A1 | 1/2016 | Saltzgiver et al. | G01F 23/263 |
| 2016/0041024 A1 | 2/2016 | Reimer et al. | G01F 23/296 |
| 2016/0146653 A1 | 5/2016 | Skelding | E21B 21/01 |
| 2016/0169839 A1 | 6/2016 | Gottlieb et al. | G01N 29/02 |
| 2016/0320226 A1 | 11/2016 | Schaefer et al. | G01F 23/296 |
| 2017/0010144 A1 | 1/2017 | Lenner et al. | G01F 23/296 |
| 2017/0010145 A1 | 1/2017 | Lenner et al. | G01F 23/2962 |
| 2017/0010146 A1 | 1/2017 | Kassubek et al. | G01F 23/2962 |
| 2017/0059389 A1 | 3/2017 | Moore et al. | G01F 23/2968 |
| 2017/0082650 A1 | 3/2017 | Hies et al. | G01F 25/0007 |
| 2017/0102095 A1 | 4/2017 | Kunita et al. | F16K 7/0091 |
| 2017/0309989 A1 * | 10/2017 | Waelde | H01Q 3/08 |
| 2018/0035603 A1 * | 2/2018 | Kremmer | G01F 23/0076 |
| 2018/0044159 A1 * | 2/2018 | Crouse | F17C 13/021 |
| 2018/0080809 A1 | 3/2018 | Tokarev et al. | G01F 23/2965 |
| 2018/0299317 A1 * | 10/2018 | Truong | G01F 23/2927 |
| 2019/0011304 A1 | 1/2019 | Cunningham et al. | G01F 17/00 |
| 2019/0063984 A1 | 2/2019 | Bowley | G01F 23/2962 |
| 2019/0078927 A1 | 3/2019 | Takayama et al. | G01F 23/2965 |
| 2019/0272496 A1 | 9/2019 | Moeller | G06Q 10/087 |
| 2020/0018628 A1 | 1/2020 | Head et al. | G21C 17/022 |
| 2020/0182736 A1 | 6/2020 | Kim et al. | G01M 3/2807 |

OTHER PUBLICATIONS

Amjad, Umar et al. "Change in time-to-flight of longitudinal (axisymmetric) wave modes due to lamination in steel pipes" Proceedings of SPIE vol. 8695, Health Monitoring of Structural and Biological Systems 2013, 869515 (Apr. 17, 2013); 10 pgs.

Amjad, Umar et al., "Effects of transducers on guided wave based structural health monitoring" Proceedings of SPIE, vol. 10600, Health Monitoring of Structural and Biological Systems XII, 106000F (Apr. 23, 2018),10 pgs.

Amjad, U. et al., "Generalized representations and universal aspects of Lamb wave dispersion relations" Proceedings of SPIE, vol. 7650, Health Monitoring of Structural and Biological Systems 2010, 76502F (Apr. 8, 2010), 9 pgs.

Amjad, Umar et al., "Detection and quantification of pipe damage from change in time of flight and phase" *Ultrasoncis* vol. 62 (2015) pp. 223-236, Jun. 11, 2015, 14 pgs.

Amjad, Umar et al., "Detection and quantification of diameter reduction due to corrosion in reinforcing steel bars" *Structural Health Monitoring* 2015, vol. 14(5) 532-543, 12 pgs.

Amjad, Umar et al., "Detection and quantification of delamination in laminated plates from the phase of appropriate guided wave modes" *Optical Engineering* 55(1), Jan. 2016, 11 pgs.

API: American Petroleum Institute Preliminary Program, Oct. 16-17, 2019, 5 pages.

Gurkov, Andrey "Gigantic Druzhba oil pipeline paralyzed for weeks" May 7, 2019, 3 pages, https://www.dw.com/en/gigantic-druzhba-oii-pipeline-paralyzed-for-weeks/a-48638989.

Luck, Marissa "Deer Park fire a 'blemish' for the petrochemical industry's image" *Houston Chronicle*, Mar. 26, 2019, 3 pages https://www.houstonchronicle.com/business/energy/article/Deer-Park-fire-a-blemish-for-the-image-of-13717661.php).

Pluta et al., "Stress Dependent Dispersion Relations of Acoustic Waves Travelling on a Chain of Point Masses Connected by Anhanmonic Linear and Torsional Springs" *International Congress on Ultrasonics* AIP Conf. Proc. 1433, 471-474 (2012); 5 pgs.

Shelke, et al., "Mode-Selective Excitation and Detection of Ultrasonic Guided Waves for Delamination Detection in Laminated Aluminum Plates" IEEE Transactions on Ultrasonics, Ferroelectrics, and Frequency Control, vol. 58, No. 3, Mar. 2011, 11 pgs.

"TOPS Terminal Operating Practices Symposium" Program Agenda, Apr. 11, 2018, 1 page.

U.S. Appl. No. 16/914,092, filed Jun. 26, 2020, Heim et al.

International Search Report and Written Opinion issued in PCT/US20/35404, dated Aug. 24, 2020, 11 pages.

International Search Report and Written Opinion issued in PCT/US20/39966, dated Sep. 18, 2020, 13 pages.

Office Action issued in U.S. Appl. No. 16/914,092, dated Nov. 10, 2020, 22 pgs.

Hassanzadeh et al., "Investigation of factors affecting on viscosity reduction of sludge from Iranian crude oil storage tanks", Petroleum Science, vol. 15, Jul. 2018, pp. 634-643.

Kak et al., "Principles of Computerized Tomographic Imaging", IEEE, 1988, Chapter 2, 48 pgs.

Pandey, "Ultrasonic attenuation in condensed matter", Dissertation for V.B.S. Purvanchal University, 2009, Chapter 1, 36 pgs.

Zadler, et al., "Resonant Ultrasound Spectroscopy: theory and application", Geophysical Journal International, vol. 156, Issue 1, Jan. 2004, pp. 154-169.

Office Action issued in Application U.S. Appl. No. 16/914,092, dated Mar. 1, 2021, 25 pgs.

Office Action issued in Application U.S. Appl. No. 17/148,122, dated Mar. 2, 2021, 26 pgs.

* cited by examiner

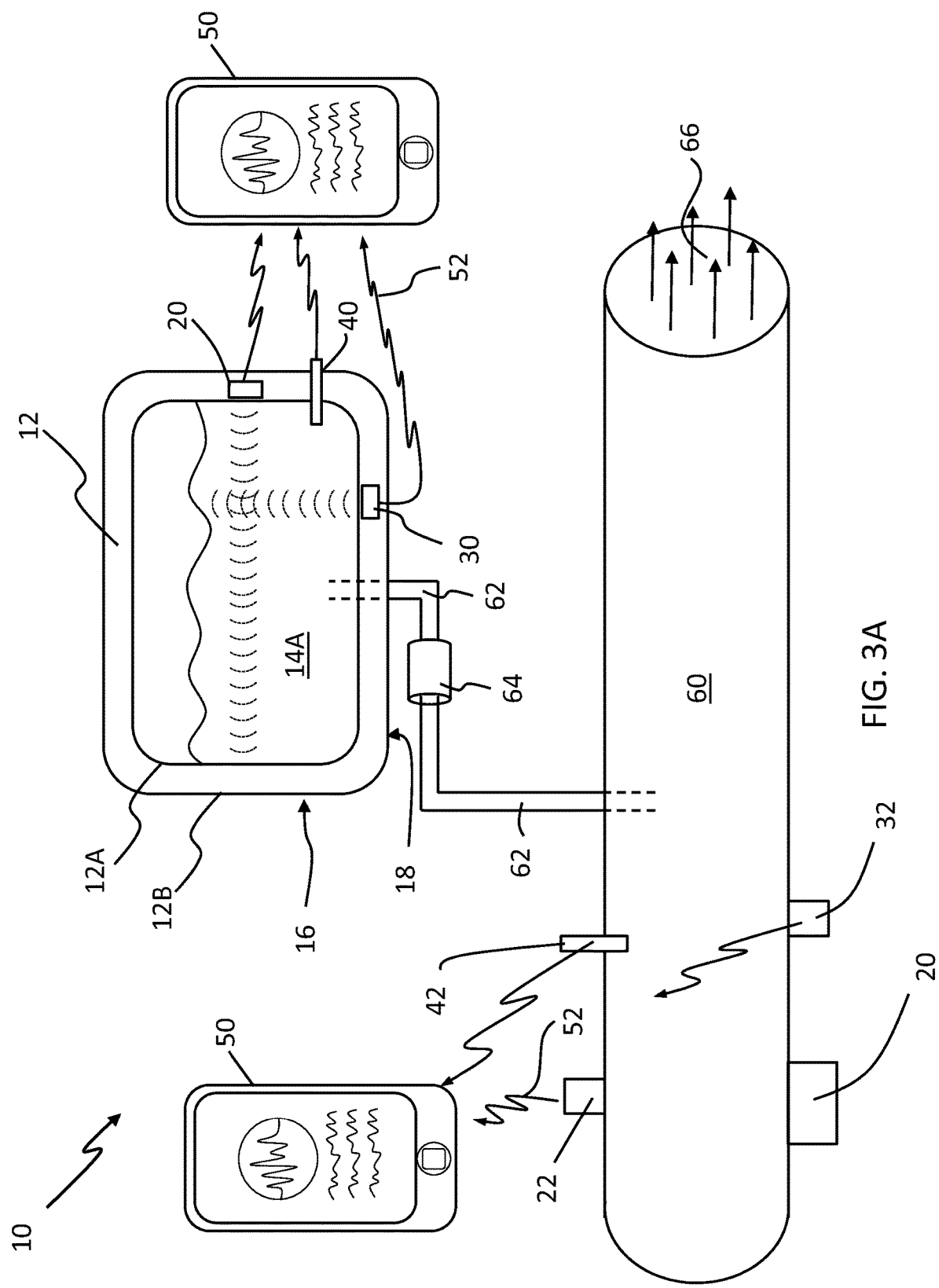

NON-LINEAR ULTRASOUND METHOD AND APPARATUS FOR QUANTITATIVE DETECTION OF MATERIALS (LIQUIDS, GAS, PLASMA)

CROSS REFERENCE TO RELATED APPLICATION

This application claims benefit of U.S. Provisional Application Ser. No. 62/855,514 entitled, "Non Linear Ultrasound Method for Qualitative and Quantitative Detection of Fluid (Liquids, Gas, Plasma) and Localized Structural Health Monitoring of a Container Containing the Fluid", filed May 31, 2019, the entire disclosure of which is incorporated herein by reference.

FIELD OF THE DISCLOSURE

The present disclosure is generally related to material metering and more particularly is related to a non-linear ultrasound method for quantitative detection of materials, including liquid, gas, and/or plasma.

BACKGROUND OF THE DISCLOSURE

Material level detection, identification and flow measurements are important for variety industries. For example, within the fossil fuel processing industry, it is often critical to ensure the correct level of fluid within the storage tank to avoid overfills. One type of fluid flow measurement is fluid metering, which is the measurement of a precise quantity of moving fluid in a specified time period to provide an accurate flow rate of the fluid. Fluid metering is used in a variety of industries which require the monitoring of fluids, including the chemical industry, fossil fuel (oil and gas) processing, and manufacturing. For example, within the fossil fuel processing industry, it is often critical to ensure that the correct amounts and types of materials held in storage vessels or moved through pipelines are precisely combined.

A variety of fluid level detection devices and techniques exist today. Most of these devices are invasive, in that, in order to detect an accurate fill level or an accurate flow of the fluid, these devices must be deployed inside the tank or pipeline. This makes them problematic to service and maintain. For example, mechanical flow meters, which utilize impellers, typically operate by measuring a fluid flow using an arrangement of moving parts, either by passing isolated, known volumes of a fluid through a series of gears or chambers, e.g., through positive displacement, or by means of a spinning turbine or rotor. Mechanical flow meters are generally accurate, in part, due to the ability to accurately measure the number of revolutions of the mechanical components which are used to estimate total volume flow over a short period of time. However, mechanical flow meters must be installed into the pipe subsystem and repair requires shut down of the pipeline, which is highly inefficient and expensive.

Acoustic time-of-flight flow meters are also conventionally used. These devices measure the difference in velocity in two opposite directions on a pipe and then calculate a difference therebetween, where the difference can be used to indicate the speed of material flowing through the pipe. Then, the calculated speed at which the material is traveling can be used, along with the size of the pipe and other parameters to determine volume flow. These conventional acoustic flow meters, however, are often not accurate enough for many industries, including many applications in the fossil fuel industry.

For fluids stored in tanks, tank fill level sensors can be used to determine a quantity of the fluid. These types of sensors may generally include either radar-based sensors which measure from the top down to the fluid surface, or embedded sensor wires and tubes which are mounted inside the tank. Fill level sensors are not highly accurate for a variety of reasons. Fluids expand and contract with temperature and most fill level sensors do not account for how temperature changes in the liquid affect a fill level. Moreover, fill level sensors must be installed inside tanks or other vessels which makes them problematic to service and maintain.

Thus, a heretofore unaddressed need exists in the industry to address the deficiencies and inadequacies.

SUMMARY OF THE DISCLOSURE

Embodiments of the present disclosure provide a system for determining a weight of a quantity of fluid. Briefly described, in architecture, one embodiment of the system, among others, can be implemented as follows. A vessel having a determinable size contains a quantity of fluid. An acoustic sensor is positionable substantially on an exterior wall of the vessel, wherein acoustic sensor determines a fill level of the quantity of fluid in the vessel. A temperature sensor senses a temperature of the quantity of fluid. A computerized device is in communication with the acoustic sensor and the temperature sensor, wherein a processor of the computerized device calculates a weight of the quantity of fluid using the determinable size of the vessel, the determined fill level, the sensed temperature, and at least one of a fluid identity or a fluid density.

The present disclosure can also be viewed as providing a system for determining a flow rate of a quantity of fluid based on a weight of the quantity of fluid. Briefly described, in architecture, one embodiment of the system, among others, can be implemented as follows. A pipe holds a quantity of fluid. A first acoustic sensor is positioned on an exterior wall of the pipe at a first location. A second acoustic sensor is positioned on the exterior wall of the pipe at a second location, wherein the second location is different from the first location, and wherein a distance between the first and second locations is determinable. A temperature sensor senses a temperature of the quantity of fluid within the pipe. A computerized device is in communication with the first and second acoustic sensors, wherein a processor of the computerized device calculates a differential time of flight of the quantity of fluid based on readings of the first and second acoustic sensors, the sensed temperature of the quantity of fluid, a volume of the pipe, and at least one of a fluid identity or a fluid density, wherein a flow by weight of the quantity of fluid is determined.

The present disclosure can also be viewed as providing methods for determining a weight of a quantity of fluid. In this regard, one embodiment of such a method, among others, can be broadly summarized by the following steps: holding the quantity of fluid within a vessel having a determinable size; determining a fill level of the quantity of fluid in the vessel with an acoustic sensor positionable substantially on an exterior wall of the vessel; sensing a temperature of the quantity of fluid with a temperature sensor; and calculating a weight of the quantity of fluid with a processor of a computerized device in communication with the acoustic sensor and the temperature sensor using the determinable size of the vessel, the determined fill level, the sensed temperature, and at least one of a fluid identity or a fluid density.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 3A is an illustration of a system for determining the weight of a quantity of fluid for metering a flow rate of the quantity of fluid to be injected into a pipe using an injection system, in accordance with a second exemplary embodiment of the present disclosure.

DETAILED DESCRIPTION

Figure 1:
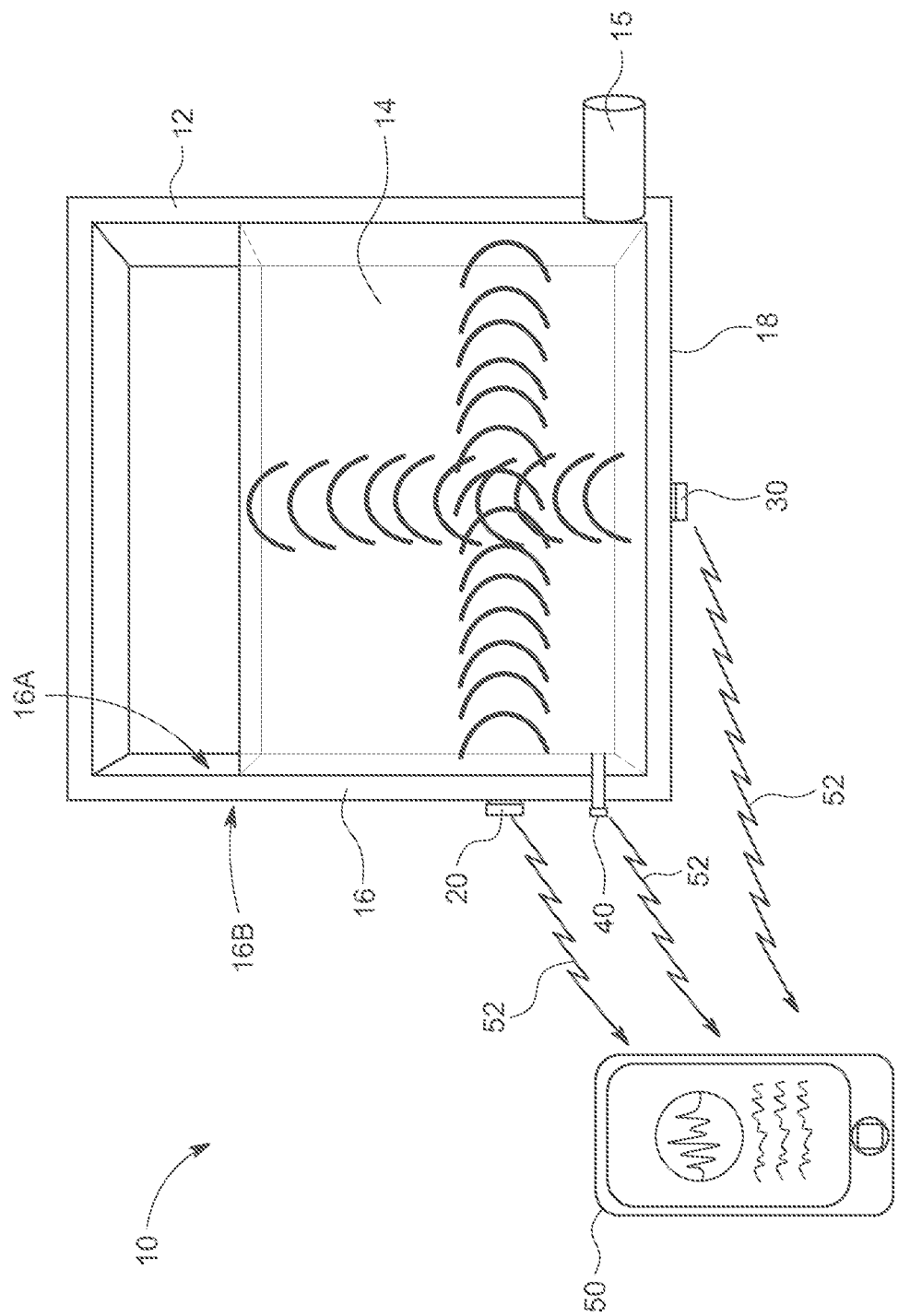
FIG. 1 is an illustration of a system for determining the weight of a quantity of fluid material in a vessel, in accordance with a first exemplary embodiment of the present disclosure.

Embodiments of the present disclosure provide a system and method for determining fluid identification, fluid level and fluid flow by weight. In accordance with this disclosure, the term "material" may be understood to include liquids, gasses, plasmas, or similar materials, or any combination thereof. In one embodiment, the system and method can be used to determine the weight of a quantity of fluid in a vessel. In another embodiment, the system and method can be used to determine the flow rate of a fluid in a pipe using a determined weight of the fluid. The present disclosure may be used to detect the type of the material without physical contact to the material and without chemical analysis. The techniques may utilize non-linear ultrasound which is used to detect the quantitative properties of the material. Other embodiments of the present disclosure can be used where physical contact to the material is made and without chemical analysis. Other embodiments of the present disclosure may be used to detect or monitor the structural health of a container or vessel containing a fluid, such that a crack, corrosion, or other structural characteristic of the container can be detected.

It is well known that the density of a material varies with temperature and pressure. This variation is typically small for liquids, but it has been observed that fluid tank levels increase and decrease noticeably with nothing other than temperature changes. Increasing the pressure on a material decreases the volume of the material and thus increases its density. Increasing the temperature of a material (with a few exceptions) decreases its density by increasing its volume. Thus, due to the effect on a material's volume that temperature and pressure can have, determining the weight of a material provides a higher accuracy on the specific quantity of that material. Determining the weight of a material serves several other benefits as well. Materials are sold around the world by weight. While changes in temperature result in changes in pressure and/or volume of a material, the weight, or mass in gravity, of a material does not change due to changes in temperature, pressure, or density. Thus, determining the weight of a material may provide a more accurate way to measure or confirm the quantity of material during a commercial transaction.

The subject disclosure is directed to the use of material metering to determine product flow rates of material by using acoustics, which in turn, can be used to determine changes in weight of material being transferred. The result is that the ability to provide highly accurate measurements of material flow rate by calculating the change in weight of the material on a periodic basis, e.g., at predetermined time intervals over a historic time period. For example, using acoustics to measure the weight of the material stored inside a tank or container every ten seconds can be used to provide the net change in material over a specific period, e.g., one minute, which can indicate a flow rate of the product leaving or entering the tank or pipe.

FIG. 1 is an illustration of a system 10 for determining a weight of a quantity of fluid material in a vessel, in accordance with a first exemplary embodiment of the present disclosure. The system 10 for determining the weight of the quantity of fluid, which may be referred to herein simply as 'system 10' may be attached to the wall 16 of a vessel 12 containing the fluid 14. A first acoustic sensor 20 is located along a wall 16 of the vessel 12. A second acoustic sensor 30 is located along a bottom wall 18 of the vessel 12, wherein the second acoustic sensor 30 measures a fill level of the fluid 14 in the vessel 12. A temperature sensor 40 is located on, near, or within the vessel 12, wherein the temperature sensor 40 measures a temperature of the fluid 14.

It is desirable to determine the weight of the fluid 14 because the weight is a highly accurate parameter to determine other characteristics of the fluid 14, such as a flow rate of fluid 14 out of or in to the vessel 12, such as through an outlet or inlet pipe 15. Within the chemical and fossil fuel industry, weight is considered the most accurate means of material measurement, easily surpassing volume or a measured quantity, such as liters, gallons, or barrels. Indeed, tanker shipments of petroleum products are measured in metric tons not by the barrel.

In operation, the system 10 may be used with a quantity of fluid 14 where the specific fluid type is either known or unknown. For example, the vessel 12 may be filled with a fluid 14 which is specifically known to be a certain chemical or substance, or the type of fluid 14 within the vessel 12 may be unknown. If the fluid type is unknown, the first acoustic sensor 20 may be capable of accurately identifying the liquid material using known acoustic metrics which are temperature-compensated against a database to identify the specific liquid type.

Once the fluid 14 is identified, or if it is previously known, the second acoustic sensor 30 which is positioned on a bottom wall 18 of the vessel 12 may be used to determine an extremely accurate fill level measurement. In other words, the height of the upper surface of the fluid 14 within the vessel 12 can be determined here. Then, using this determined fill level and engineering information from the vessel 12, e.g., a strapping table which identifies a volumetric quantity of fluid at certain heights or fill levels of the vessel 12, the exact volume of the fluid 14 can be determined. The temperature of the fluid 14 may be taken into consideration at this step, which may be achieved through direct temperature measurement, e.g., from the temperature sensor 40, or from ambient temperature calculation or other techniques. With the type of fluid 14 material identified, the height of the upper surface of the fluid 14 in the vessel 12 and the temperature of fluid 14 may be used to calculate weight.

While it is possible to utilize the acoustic sensor 30 positioned on the bottom wall 18 of the vessel 12 to determine the fill level of the fluid 14 within the vessel 12, it may also be possible to utilize one or more acoustic sensors in other locations on the vessel 12 to determine the fluid 14 fill level. For example, a plurality of acoustic sensors 30 may be positioned on the exterior of the vessel 12 in positions along the lower sidewall 16. These sensors 30 may be oriented at varying angles relative to the height of the vessel 12. For instance, in one example, five or more sensors 30 may be used with orientations of varying angles, such as 15°, 30°, 45°, 60°, and 75°, such that each sensor 30 is positioned to identify the fill level at a particular height in the vessel 12. In another example, sensors 30 may be positioned at spaced distances along the vertical sidewall of the vessel 12, such that each sensor 30 can determine when the fill level of the fluid 14 has moved below the height of the sensor 30, respectively, which can be used to identify fluid 14 fill level within the vessel 12. Any number of sensors in any positions and with any orientations may be used, all combinations of which are considered within the scope of the present disclosure. It may be advantageous to utilize a single acoustic sensor 30 positioned on the bottom wall 18 of the vessel 12, due to efficiency and lower material expense, but vessels 12 which do not allow access to their bottom walls 18, such as those sitting on the ground surface, may be used with the other configurations of sensors to accurately determine a fluid 14 fill level.

If the identity of the fluid 14 material type in the vessel 12 cannot be determined, the density of the fluid 14 can be sensed and determined, and it is possible to calculate the actual weight of the specific fluid 14 based on the sensed and determined density, volume and temperature of the fluid. Using this information, it is then possible to accurately calculate the weight of the fluid 14 at a specific point in time.

The calculations completed by the system 10 may be processed with a computerized device 50 in communication with the first acoustic sensor 20, the second acoustic sensor 30, and the temperature sensor 40. To determine the flow of the fluid 14 by weight, the processor of the computerized device 50 may calculate the weight of the fluid 14 at two or more times, or at predetermined time intervals, based on at least the sensed fill level provided by acoustic sensor 30 and the temperature from temperature sensor 40. The computerized device 50 may receive the sensed information via signals 52 from the sensors, which may be wired, wireless, or any combination thereof. The computerized device 50 may be a hand-held computing device such as a tablet computer, a smart phone, a reader, a laptop, or a stationary computing device, or any other electronic device capable of receiving the signals and calculating the data points using algorithms and processing. The computerized device 50 may include a display screen or GUI which provides relevant information to a human user, or it may be interconnected with another computing device through a network or the Internet to transfer the relevant information elsewhere.

It is also noted that the system 10 can be implemented on vessel 12 without intrusion. The first and second acoustic sensors 20, 30 need only be adhered to the outside of the vessel 12 and the temperature sensor 40 can be located outside or inside the vessel in a convenient position for sensing temperature of the fluid 14. The vessel 12 does not need to be emptied or otherwise opened in order to configure the system 10. Where a vessel 12 is a double-walled vessel, such as shown in FIG. 1, the first and second acoustic sensors 20, 30 may be located on an exterior surface of the vessel 12, or external to an interior surface of the inner sidewall 16A, e.g., in a gap between the inner sidewall 16A and the outer sidewall 16B. The temperature sensor 40 may be placed through the inner and/or outer sidewalls 16A, 16B, e.g., in a position extending from exterior of the vessel 12 to the interior of the vessel 12, such that it can maintain good temperature readings on the fluid 14 within the vessel 12. In other examples, the temperature sensor 40 could be positioned in other locations and would not necessarily need to be in contact with the fluid 14 or the vessel 12. All types of temperature sensors 40 can be used, including infrared temperature sensors, thermistors, other temperature sensing devices, or any combination thereof. Of course, it is also possible for the first and second acoustic sensors 20, 30 and/or the temperature sensor 40 to be mounted within a vessel 12 if it is desired.

Figure 2:
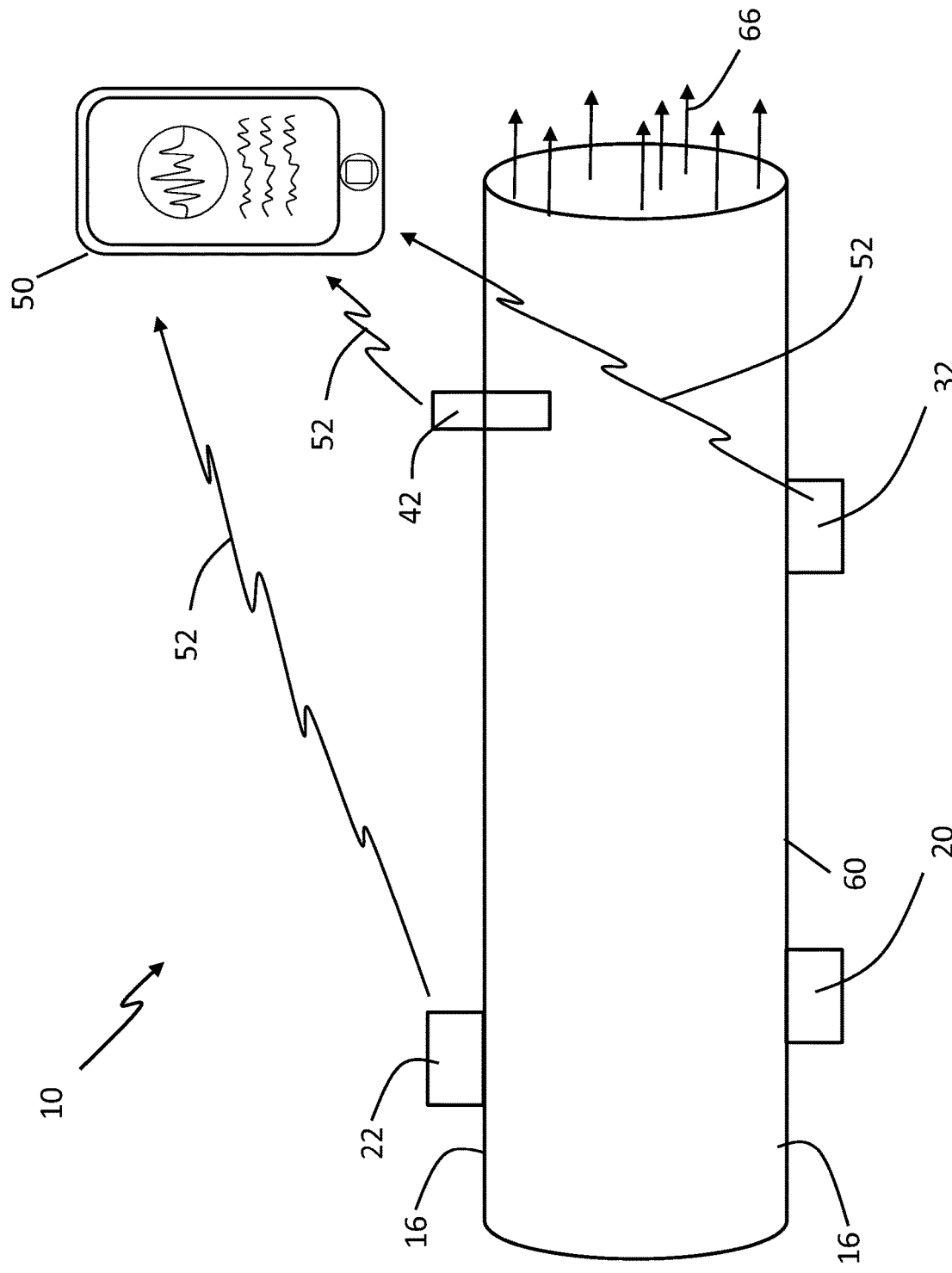
FIG. 2 is an illustration of a system for determining a flow rate for a quantity of fluid within a pipe, in accordance with the first exemplary embodiment of the present disclosure.

In one of many alternative configurations, it may be possible to use multiple acoustic sensors to determine the flow rate of fluid 14 within a vessel 12, in particular, a vessel 12 designed or intended for the transportation of fluid 14, such as a pipe, pipeline, or similar fluid-transporting vessel 12. Similar to the configuration described relative to FIG. 1, the exact flow rates may be determined by weight of fluid. FIG. 2 is an illustration of a system 10 for determining a flow rate for a quantity of fluid within a pipe 60, in accordance with the first exemplary embodiment of the present disclosure. Indeed, FIG. 2 illustrates the system 10 with a pipe 60, which is a vessel which contains and transports the quantity of fluid 66. A first acoustic sensor 22 is located along a wall 16 of the pipe 60, or in a similar position, such as substantially on a wall 16 of the pipe 60. A second acoustic sensor 32 is located along the pipe 60 at a specified or known distance from first sensor 22. A differential time of flight or similar calculation of the fluid 66 in the pipe 60 may be determined using readings of the first acoustic sensor 22 and the second acoustic sensor 32. The differential time of flight may then be used to determine the velocity flow of fluid 66.

In one example, the calculation of the velocity of the material may be determined as follows. The first acoustic sensor 22, i.e., transducer, generates a signal that is received by the second acoustic sensor 32 on the pipe 60. The time taken for the signal to travel from the first acoustic sensor 22 to the second acoustic sensor 32 is known as the Time of Flight (ToF). Then the second acoustic sensor 32 generates a signal which is received from the first acoustic sensor 22 and the difference between the two ToF's is taken as a measure of the velocity of the flow of the material in the pipe 60. From the first acoustic sensor 22 to the second acoustic sensor 32, from the known density of the fluid 66 in the pipe 60, the flow of the material can be calculated:

$$ToF = \frac{D_{tr}}{U_{sp}}$$

Where $D_{tr}$ is the distance between the first and second acoustic sensors 22, 32. Depending on the configuration, this can be equal to the diameter of the pipe 60 or the least distance the signal between will travel between both transducers. $U_{sp}$ is the temperature compensated speed of sound in the material flowing through the pipeline:

$$ToF_1 = \frac{D_{tr}}{U_{sp}^1}$$

$$ToF_2 = \frac{D_{tr}}{U_{sp}^2}$$

Where $U_{sp}^1 = (U_{sp} - V)$ and $U_{sp}^2 = (U_{sp} + V)$, where (V) is the velocity of the material. The velocity can be calculated when the acoustic sensors are on the same side of the pipe 60, in which case, the distance and the component of the speed accounting for the angle of the path the signal travels between the two acoustic sensors and the back wall of the pipe is calculated. $\Delta ToF = (ToF_2 - ToF_1)$ is the time difference between $ToF_1$ and $ToF_2$ $$\Delta ToF = \frac{D_{tr}}{U_{sp}^1} - \frac{D_{tr}}{U_{sp}^2} = \frac{D_{tr}}{(U_{sp} - V)} - \frac{D_{tr}}{(U_{sp} + V)}$$

Rearranging the above equation for velocity, V of the velocity of the material in the pipeline ( ) can be derived from the following equation.

$$V = \Delta ToF * \frac{U_{sp}}{2 * D_{tr}}$$

It is noted that the differential time of flight may be calculated both in a bidirectional manner and/or in a unidirectional manner. For a bidirectional calculation, the differential time of flight of the fluid 66 may be calculated based on readings of the first and second acoustic sensors 22, 32 in two directions of the pipe 60, for example, in both linear forward and backward directions along a flow of the pipe 60. For a unidirectional calculation, the differential time of flight may be calculated by measuring a time of flight in one direction of the pipe 60 and comparing it to an imputed or calculated time of flight based on an acoustic wave velocity of the fluid in a stationary state. As opposed to directly measuring this imputed value of the fluid in a stationary state, this value may be achieved using the fluid 66 material identity and the temperature to derive or lookup the imputed time of flight based on the wave velocity. Then, the wave velocity is applied to the distance between the two acoustic sensors 22, 32 to derive a calculated stationary time of flight. In this way, the time of flight in one direction may be effectively compared to the expected acoustic wave through the fluid 66 when it is in a static or non-moving position within the pipe 60.

A temperature sensor 42 is positioned with pipe 60, wherein the temperature sensor 42 senses a temperature of the fluid 66. While a temperature sensor 42 in physical contact with the pipe 60 may be used, the temperature of the fluid 66 in the pipe 60 may also be provided by alternative methods, including temperature sensing devices which would not necessarily need to be in contact with the fluid 66 or the pipe 60. All types of temperature sensors 42 can be used, including infrared temperature sensors, thermistors, other temperature sensing devices, or any combination thereof.

In addition, multiple calculations can be done during specific time intervals which can be used to determine the flow rate of the fluid 66 during fluctuations in actual flow rates over longer periods of time interval measurements. As a simple example, a straight 2-foot radius pipe has a known diesel (53 lb/ft³ density at 15° C.) flowing at 3 ft/s. The area of the pipe is 12.5 ft², leading to a flow volume of 37.5 ft³/sec. Multiplying the flow volume by the density provides the weight of the diesel flowing through the pipe at 1,988 lb/s. If at the next measurement the velocity changed to 3.5 ft/s, then the weight of the diesel flowing through the pipe would be an increase to 2,319 lb/s. These calculations can be performed at specific time intervals to identify the changes or fluctuations between the time intervals, which in turn, can be used to determine flow rates over a longer period of time.

These weight-flow measurements may be taken periodically, from every few seconds to every hour, or any other time period. The changes in these weight-flow rates over an extended period of time, which measure the varying amounts of fluid 66 flowing through the pipe 60, provide an accurate normalized calculation of material flow rate by weight. From this information, highly accurate and standardized fluid volume flows, e.g., gallons per hour, etc., and fluid weight flows, e.g., pounds per hour, etc., can be identified.

Moreover, the system 10 can be used to determine the fluid temperature, fluid identity and specific information as to density and weight of the fluid 66 in real-time or substantially real-time, which provides a substantial improvement over other metering devices which do not operate in real-time. It is also noted that the system 10 can be implemented on pipe 60 without intrusion. The first and second acoustic sensors 22, 32 need only be attached to the outside of the pipe 60 and the temperature sensor 42 can be located in a convenient position for sensing temperature. The pipe 60 does not need to be emptied or otherwise opened in order to configure the system 10.

The calculations completed by the system 10 may be processed with a computerized device 50 in communication with the acoustic sensor 20, which determines the identity of the fluid material, and with other acoustic sensors 22, 32, as well as the temperature sensor 42. To determine the flow rate by weight of the fluid 66, the processor of the computerized device 50 may calculate the flow rate by weight of the fluid 66 at predetermined time intervals based on the sensed and determined volume flow rate and fluid density. The computerized device 50 may receive the sensed information via signals 52 from the sensors, which may be wired, wireless, or any combination thereof. The computerized device 50 may be a hand-held computing device such as a tablet computer, a smart phone, a reader, a laptop, a stationary computing device, any other electronic device or service capable of receiving the signals and calculating the data points using algorithms and processing. The computerized device 50 may include a display screen or GUI which provides relevant information to a human user, or it may be interconnected with another computing device through a network, the Internet or cloud service to transfer the relevant information elsewhere.

The system 10 described relative to FIGS. 1-2 may have a variety of uses in a variety of different industries and settings. These may include use in chemical industry or the fossil fuel industry to determine material type based on weight, and/or to determine a flow rate of that material within a vessel or pipe. The system may also find uses in environmental analysis, with recreational items, such as swimming pools, or in other settings. One specific use for the system 10 is with injection units used in the fossil fuel industry. An injection unit may be used to inject a quantity of fluid chemical additives into a petroleum pipeline to protect the pipes in the pipeline against corrosion or for another purpose. The amount of chemical injected may be small, compared to the relative volume of the petroleum in the pipe, but it is often critical to inject the correct amount. Thus, it is imperative to know the exact injection flow rate of the fluid chemical into the pipeline.

Figure 3B:
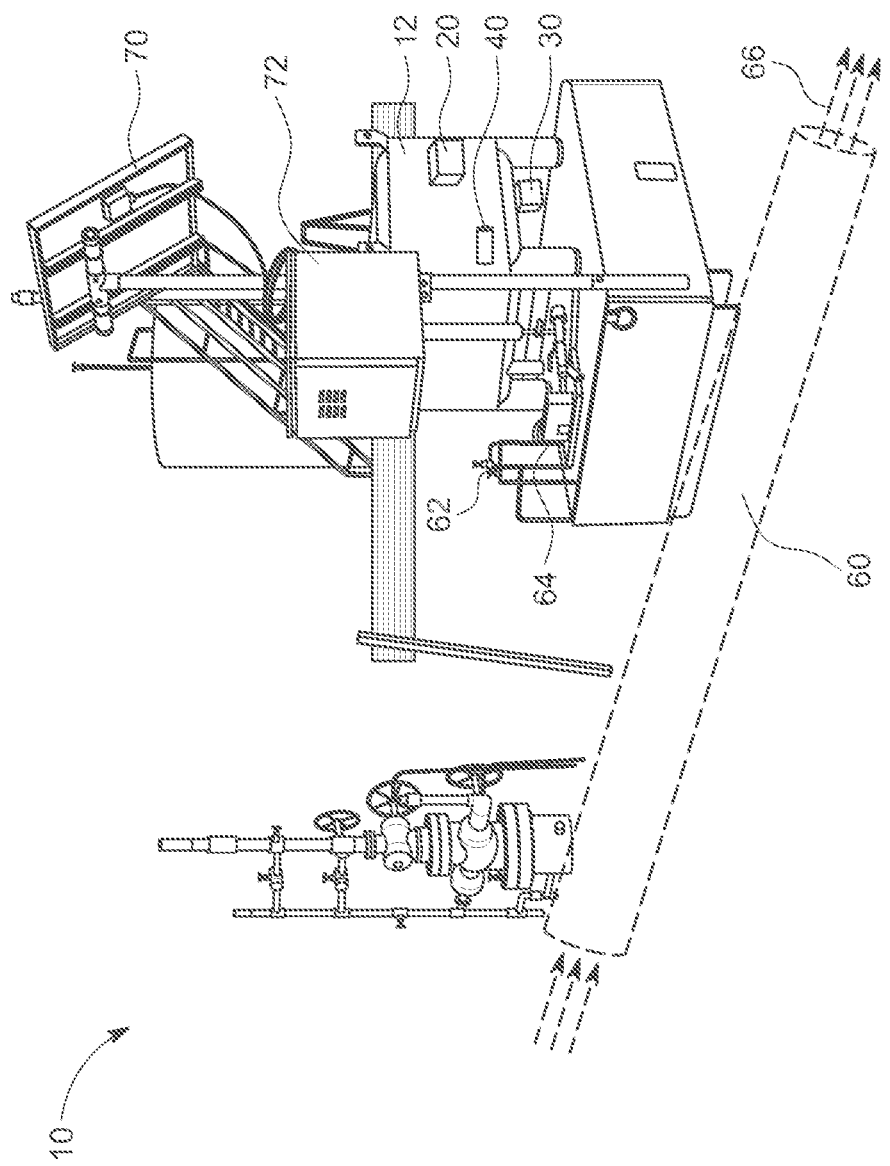
FIG. 3B is an image of an injection system using the system, in accordance with the second exemplary embodiment of the present disclosure.

FIG. 3A is an illustration of a system for determining the weight of a quantity of fluid 14A for metering a flow rate of the quantity of fluid 14A to be injected into a pipe 60 using an injection system, in accordance with a second exemplary embodiment of the present disclosure. FIG. 3B is an image of an injection system using the system 10, in accordance with the second exemplary embodiment of the present disclosure. FIG. 3A illustrates the system 10 depicted and described relative to FIG. 1, which has a vessel 12 containing the quantity of fluid 14A. A first acoustic sensor 20 is located along a sidewall 16 of the vessel 12, and identifies the fluid material. A second acoustic sensor 30 is located along a bottom wall 18 of the vessel 12, wherein the second acoustic sensor 30 senses a fill level of the quantity of fluid 14A in the vessel 12. A temperature sensor 40 is located proximate to the vessel 12, wherein the temperature sensor 40 senses a temperature of the quantity of fluid 14A.

As shown in FIG. 3A, the quantity of fluid 14A, which in this example is a fluid chemical, may be housed within the vessel 12 which is connected to the pipeline 60 through a network of pipes 62, where the fluid chemical 14A is pumped from the vessel 12 with a fluid pump 64. The pipeline 60 may have a quantity of other fluid 66, such as fossil fuels or another fluid, depending on the design and use of the pipeline. The system 10 may be used in a variety of ways to accurately inject the fluid chemical 14A into the pipe 60. For example, as discussed relative to FIG. 1, the first acoustic sensor 20 may sense a material type of the fluid chemical 14A in the vessel 12, while the second acoustic sensor 30 may sense a fill level of the fluid chemical 14A. As the fluid chemical 14A is dispensed via the pipes 62 and pump 64, calculations may be performed by the computerized device 50 sent via signals 52 at varying periods of time or intervals to determine the fill level at each time period. These calculations can then be used to determine the flow rate of the chemical fluid 14A from the vessel 12, which in turn, can be used to control the pump 64 to dispense the fluid chemical 14A into the pipe 60 at the desired rate.

In another example, the acoustic sensors 20, 22, and 32 positioned on or proximate to the pipe 60 may be used to determine the flow rate of the fluid 66 through the pipe 60 using the technique discussed previously relative to FIGS. 1-2, e.g., using the acoustic sensor 20, which determines the fluid identity, and using first and second acoustic sensors 22, 32, which are used to determine the flow rate, along with the temperature sensor 42. When the flow rate of the fluid 66 through the pipe 60 is determined, the system 10 may control the pump 64 to dispense a portion of the fluid chemical 14A from the vessel 12 into the pipe 60. If the flow rate of the fluid 66 within the pipe 60 changes or fluctuates, the system 10 may be able to adjust the flow rate of the chemical fluid 14A from the vessel through the pipes 62 and into the pipe 60, thereby accurately controlling a metering of the flow rate of the fluid chemical 14A into the pipe 60. In this way, the system can dynamically control the injection of the fluid chemical 14A into the pipe 60 to ensure that the desired quantity of fluid chemical 14A is being injected, despite fluctuations in flow rate of the fluid 66 within the pipe 60.

In a third example, the flow rates of the fluid 14A within the vessel 12 or within the pipe 62 and the flow rate of the fluid 66 within the pipe 60 may be determined, such that the pump can be dynamically controlled to continually adjust the rate of injection of the fluid chemical 14A into the pipe 60, and the level of fluid chemical 14A can be monitored to ensure it is not inadvertently depleted. Any combination of these examples may be used to detect the flow rates of fluids 14A, 66 or otherwise control a metering device, such as the pump 64, to inject or transport one fluid to another.

Similar to FIGS. 1-2, the calculations in FIG. 3A completed by the system 10 may be processed with one or more computerized devices 50 in communication with the acoustic sensor 20, which determines the identity of the fluid material in either the vessel 12 or the pipe 60, the acoustic sensor 30 which determines the fill level of the fluid 14A in the vessel 12, and with other acoustic sensors 22, 32 which determine flow rate in the pipe, as well as the temperature sensors 40, 42. While two computerized devices 50 are illustrated in FIG. 3A, any number of computerized devices 50 may be used. The one or more computerized devices 50 may receive the sensed information via signals 52 from the sensors, which may be wired, wireless, or any combination thereof. The one or more computerized devices 50 may be a hand-held computing device such as a tablet computer, a smart phone, a reader, a laptop, a stationary computing device, any other electronic device or service capable of receiving the signals and calculating the data points using algorithms and processing. The one or more computerized devices 50 may include a display screen or GUI which provides relevant information to a human user, or it may be interconnected with another computing device through a network, the Internet or cloud service to transfer the relevant information elsewhere.

One of the many benefits of the system 10 is that it can be used on existing fluid infrastructure without significant alterations. For example, as shown in FIG. 3B, the skid-mounted injection unit may be used in a remote location where petroleum is stored and/or piped through an underground pipe 60. In these types of locations, it is often not possible to access the pipe 60 (shown in broken lines) because it is buried or otherwise not easily accessible. The skid-mounted injection unit may be placed over the pipe 60 such that the chemical additive can be injected at the appropriate location along the pipeline. An electrical power supply may not exist at this remote location, so a solar power source 70 and battery 72 may be used to power the pump 64 which controls injection of the fluid chemical into the pipe 60. The system 10 has low power requirements which can easily be met with the existing solar power source on injection units. Additionally, the sensors of the system 10 can easily be integrated into the existing liquid vessels of injection units, either through retrofit or original manufacture. It is noted, of course, that the system 10 can be used with other petroleum fluid vessels, including tankers, railcars, etc.

Figure 4A:
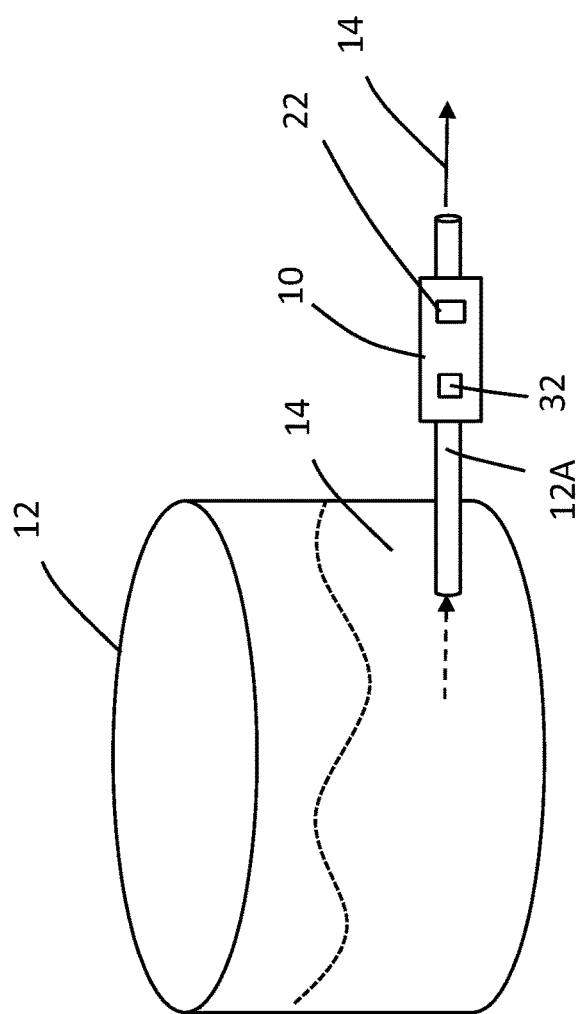
FIG. 4A is an illustration of a system for detecting changes in a flow rate for a quantity of fluid from a vessel, in accordance with the first exemplary embodiment of the present disclosure.
Figure 4B:
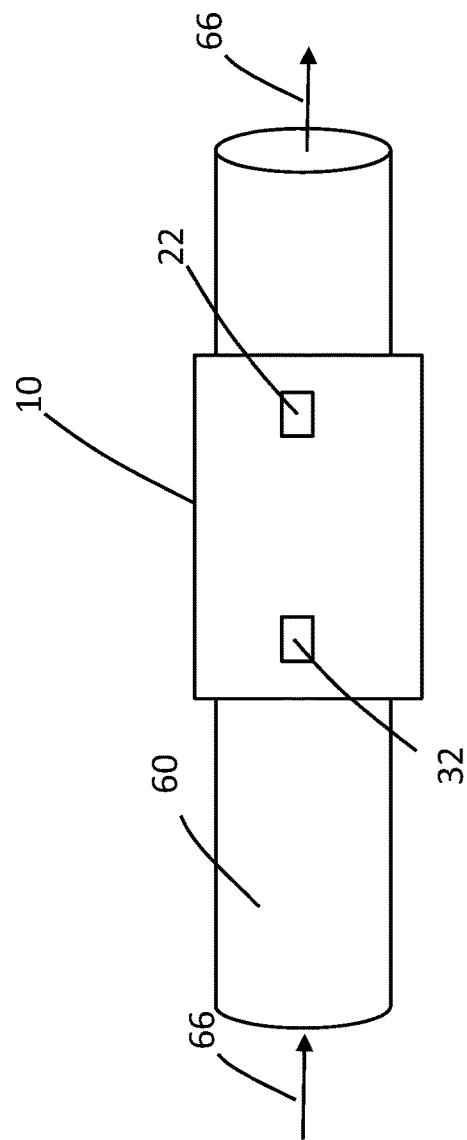
FIG. 4B is an illustration of a system for detecting changes in a flow rate for a quantity of fluid in a pipe, in accordance with the first exemplary embodiment of the present disclosure.

The present disclosure can also provide benefits to fluid flow monitoring in situations where the flow rate of a fluid through a pipe changes. FIG. 4A is an illustration of a system for detecting changes in a flow rate for a quantity of fluid 14 from a vessel 12, in accordance with the first exemplary embodiment of the present disclosure. FIG. 4B is an illustration of a system for detecting changes in a flow rate for a quantity of fluid 66 in a pipe 60, in accordance with the first exemplary embodiment of the present disclosure. As shown in both FIGS. 4A-4B, the system 10 may be implemented as a substantially unitary metering device which is positionable around an inlet or outlet pipe 12A of the vessel 12 (FIG. 4A) or around a pipe 60 of a pipeline or another fluid delivery system (FIG. 4B) to monitor for fluid movement. Once any movement of the fluid 14, 66 is detected, the system 10 would measure flow rates. The system 10 may also identify the type of fluid material, if desired, such that complete records of all fluid 14, 66 flows by volume and weight as well as the actual material type can be determined. In both FIGS. 4A-4B, if fluid 14, 66 is not flowing in pipe 12A, 60, the system 10 can ping the first and second acoustic sensors 22 and 32 periodically to determine when the fluid flow starts. The system 10 may be programmed to ping as needed to determine when the flow of fluid 14, 66 stops. The opposite may also be achieved, i.e., where there is an existing flow in the pipe 12A, 60 and the system 10 determines when a fluid flow stops. The ability of system 10 to determine when flow of fluid 14, 66 starts and stops provides additional accuracy in measuring the weight of fluid passing through pipe 12A, 60. Additionally, it is noted that the system 10 may be capable of bidirectional flowrate detection, vessel mass balance capacity, and totalizations in both directions of flow.

As can be understood, the system 10 described herein and related apparatuses and methods may provide substantial benefits to metering flow rates of fluids. To name a few of these benefits, the system can be used to accurately measure fluid transfers from or into tanks, containers or vessels to produce accurate total product movement. The system 10 can also be used to accurately produce custodial transfer documentation of fluid materials between third parties. The system 10 is also capable of being used to accurately identify leaks of liquid material from a tank, container or vessel, as well as accurately monitor inventory liquid materials stored in a tank, container or vessel.

Figure 5A:
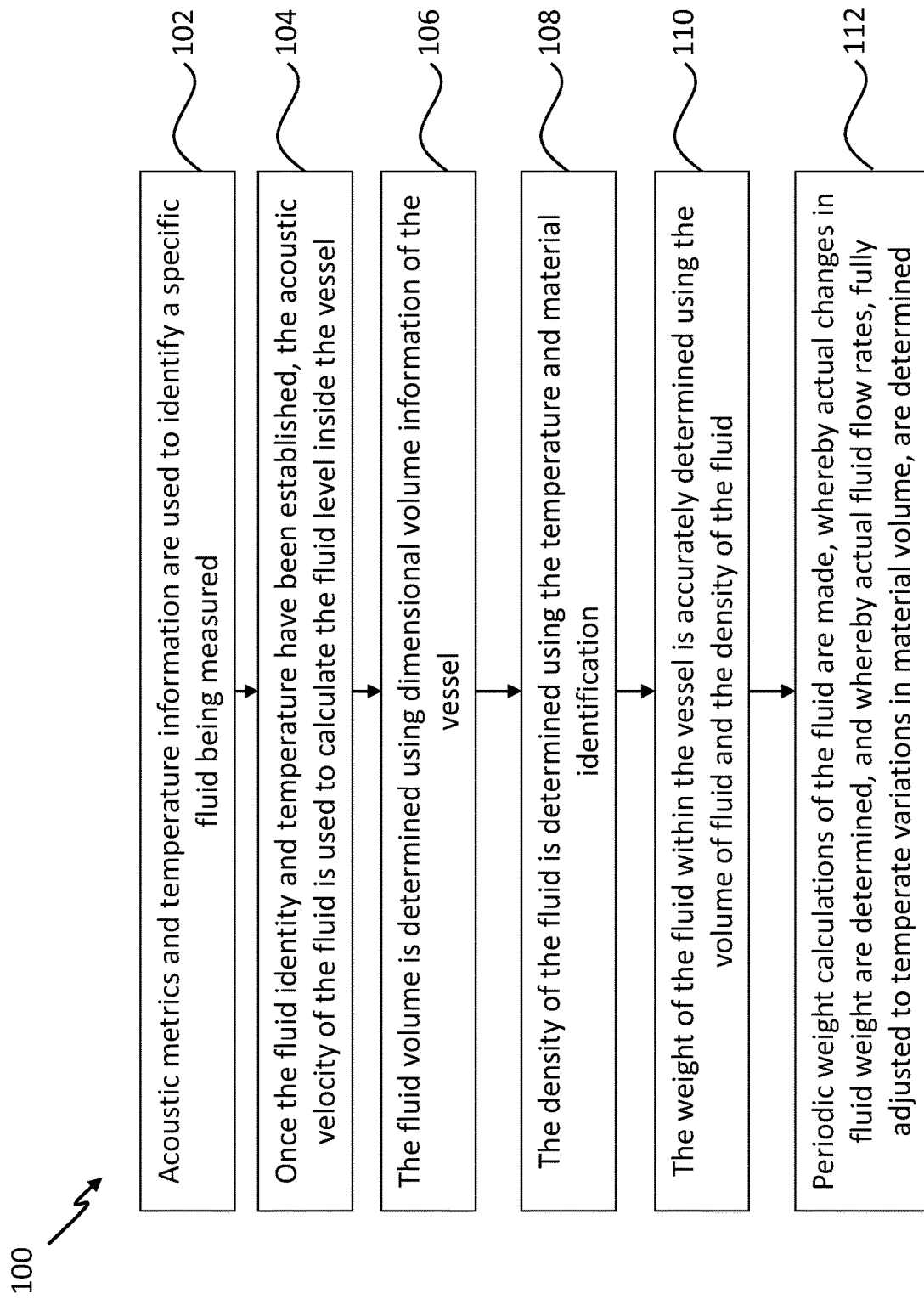
FIG. 5A is a flowchart illustrating a method of metering fluid, in accordance with the first exemplary embodiment of the present disclosure.

FIG. 5A is a flowchart 100 illustrating a method of metering a fluid, in accordance with the first exemplary embodiment of the present disclosure. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

As shown by block 102, acoustic metrics and temperature information are used to identify a specific fluid being measured. Once the fluid identity and temperature have been established, the acoustic velocity of the fluid is used to calculate the fluid level inside the vessel (block 104). The fluid volume is determined using dimensional volume information of the vessel (block 106). The density of the fluid is determined using the temperature and material identification (block 108). The weight of the fluid within the vessel is accurately determined using the volume of fluid and the density of the fluid (block 110). Periodic weight calculations of the fluid are made, whereby actual changes in fluid weight are determined, and whereby actual fluid flow rates, fully adjusted to temperate variations in material volume, are determined (block 112).

Figure 5B:
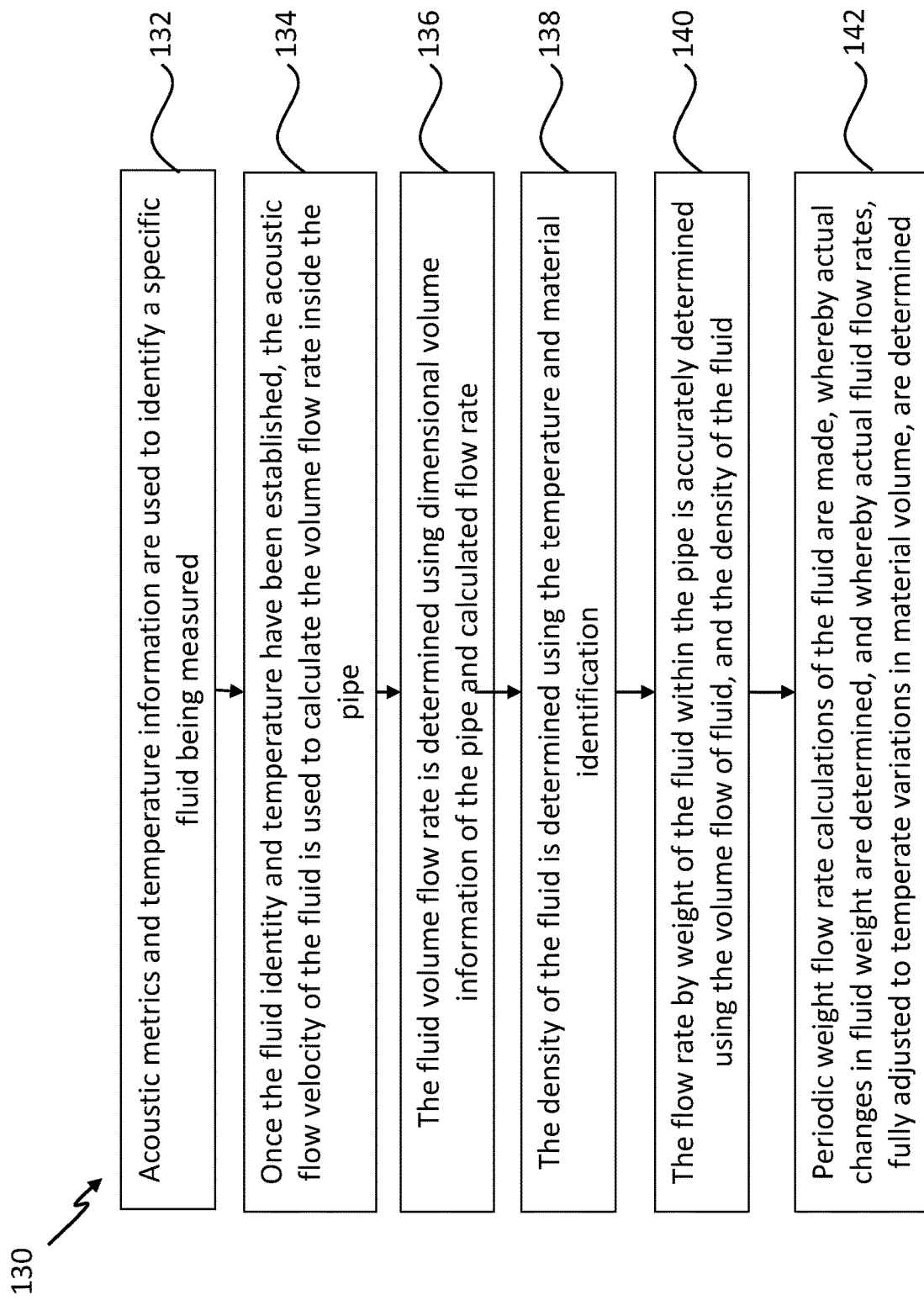
FIG. 5B is a flowchart illustrating a method of metering fluid, in accordance with the first exemplary embodiment of the present disclosure.

FIG. 5B is a flowchart 130 illustrating a method of metering a fluid, in accordance with the first exemplary embodiment of the present disclosure. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

As shown by block 132, acoustic metrics and temperature information are used to identify a specific fluid being measured. Once the fluid identity and temperature have been established, the acoustic flow velocity of the fluid is used to calculate the volume flow rate inside the pipe (block 134). The fluid volume flow rate is determined using dimensional volume information of the pipe and calculated flow rate (block 136). The density of the fluid is determined using the temperature and material identification (block 138). The flow rate by weight of the fluid within the pipe is accurately determined using the volume flow of fluid, and the density of the fluid (block 140). Periodic weight flow rate calculations of the fluid are made, whereby actual changes in fluid weight are determined, and whereby actual fluid flow rates, fully adjusted to temperate variations in material volume, are determined (block 142).

Figure 6:
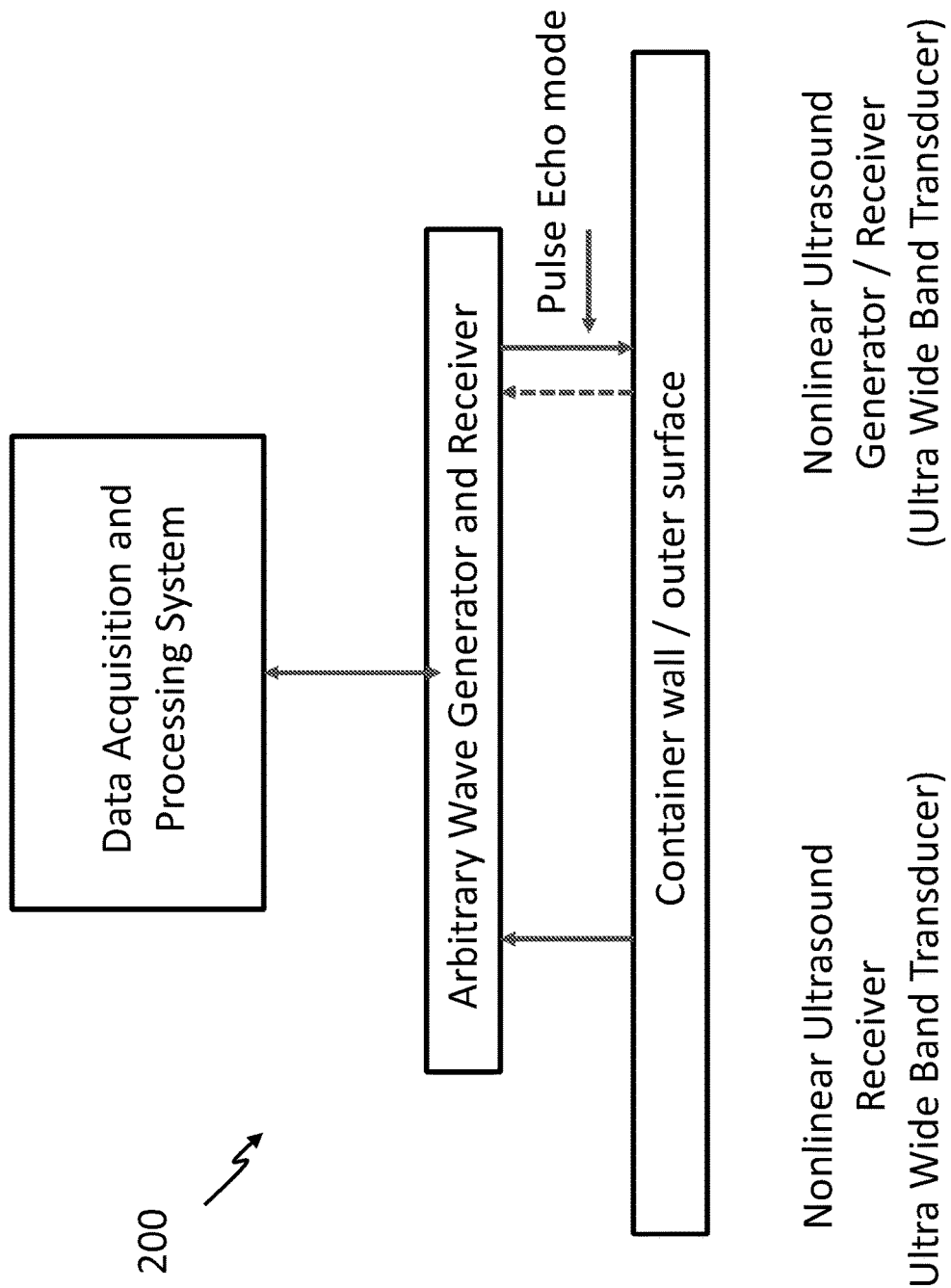
FIG. 6 is an illustration of a method of detecting structural characteristics of a vessel of FIG. 1, in accordance with a third exemplary embodiment of the present disclosure.

While FIGS. 1-5B primarily discuss the detection of the material weight and to determine a flow rate of the material, similar techniques can be used to detect structural characteristics of a container or vessel containing the fluid. FIG. 6 is an illustration 200 of a method of detecting structural characteristics of a vessel of FIG. 1, in accordance with a third exemplary embodiment of the present disclosure. FIG. 6 is an illustration 300 of comprehensive signal processing techniques used with the method of detecting structural characteristics of the vessel 12 of FIG. 1, in accordance with the third exemplary embodiment of the present disclosure.

Non-linear ultra-wide band acoustic/ultrasound signal is excited using linear/forward/reverse/exponential chirp. Apart from measuring absolute time-of-flight, differential time-of-flight is also recorded. Since sound waves are dispersive in nature, dispersion characteristics are used to determine temperature effects and localized structural health monitoring which mainly includes detection of corrosion, delamination, and cracks. To achieve high accuracy and reliability, received signal (either from same transducer in pulse-echo mode or from the second transducer in pitch-catch mode) is processed in data acquisition and processing system. Comprehensive signal processing, using multiple signal processing tools, can be used. Some of the key extracted features are absolute time-of-flight, differential time-of-flight, phase, magnitude, and frequency.

Figure 7:
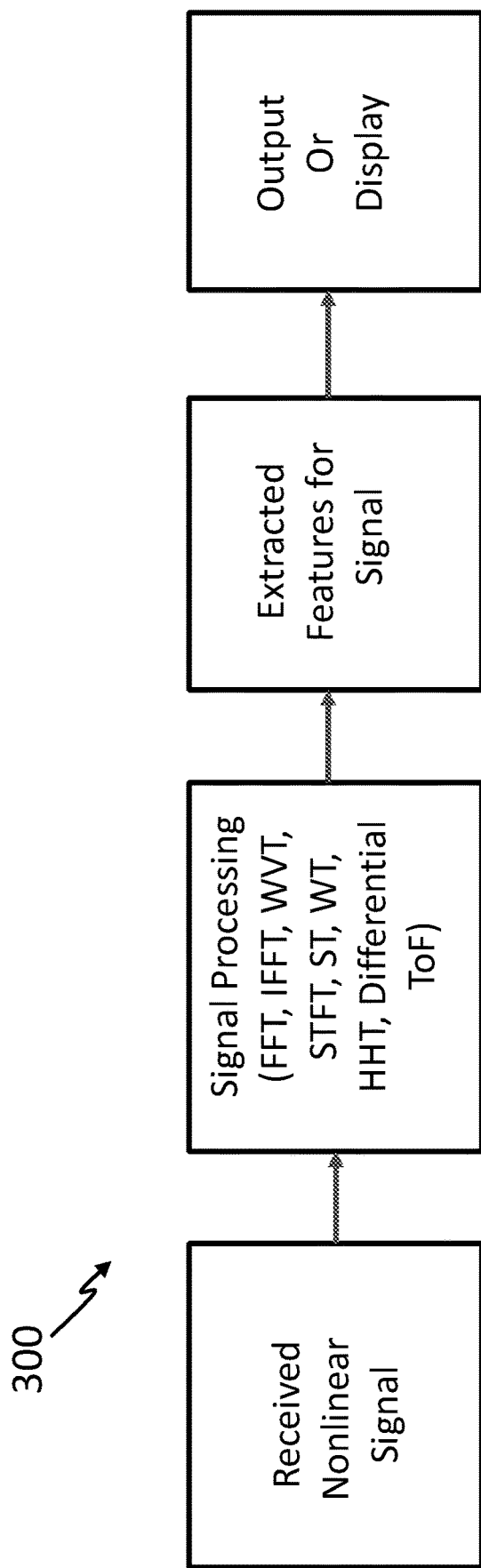
FIG. 7 is an illustration of comprehensive signal processing techniques used with the method of detecting structural characteristics of the vessel of FIG. 1, in accordance with the third exemplary embodiment of the present disclosure.

With reference to FIGS. 1, 6, and 7, together, the method and system disclosed in FIG. 6 may be used with the structural features disclosed in FIG. 1 to detect structural characteristics of a vessel 12. For example, the vessel 12, or other structural container capable of holding the fluid, may be constructed from parts which are conducting and non-conducting. The processing techniques utilize non-linear ultra-wide band acoustic/ultrasound signal which is excited using linear/forward/reverse/exponential chirp. Apart from measuring absolute time-of-flight, differential time-of-flight is also recorded. Since sound waves are dispersive in nature, dispersion characteristics are used to determine temperature effects and localized structural health monitoring of the vessel 12 itself. This may include the detection of corrosion, delamination, and cracks, among other structural characteristics which are desired to be monitored or detected. To achieve high accuracy and reliability, the received signal (either from same transducer in pulse-echo mode or from the second transducer in pitch-catch mode) is processed in data acquisition and processing system. FIG. 6 provides further details on the possible signal processing techniques, including more comprehensive signal processing using multiple signal processing tools. Some of the key extracted features are absolute time-of-flight, differential time-of-flight, phase, magnitude, and frequency.

As a working example, the use of ultrasonic guided waves for damage detection in pipes has been studied. Generally longitudinal (axial symmetric) modes are excited and detected by PZT (Lead Zirconate Titanate) transducers in transmission mode for this purpose. In most studies the change in the received signal strength with the extent of damage has been investigated while in this study the change in the phase, the time-of-flight (TOF) and differential time-of-flight of the propagating wave modes with the damage size is investigated. The cross-correlation technique is used to record the small changes in the TOF as the damage size varies in steel pipes. Dispersion curves are calculated to carefully identify the propagating wave modes. Differential TOF is recorded and compared for different propagating wave modes. Feature extraction techniques are used for extracting phase and time-frequency information. The main advantage of this approach is that unlike the recorded signal strength the TOF and the phase are extracted which are not affected by the bonding condition between the transducer and the pipe. Therefore, if the pipe is not damaged but the transducer-pipe bonding is deteriorated then although the received signal strength is altered the TOF and phase remain same avoiding the false positive alarms of damage. The goal is not only to detect the damage but also to quantify it, or in other words to estimate the damage size. The transient signals for pristine and damaged pipes were processed using the Fast Fourier Transform (FFT), Wigner-Ville Distribution Transform (WVDT), S-Transform (ST) and Hilbert Huang Transform (HHT). It is demonstrated that the time-of-flight is sensitive to the size of the damage on the pipe wall. The instantaneous phase extracted by HHT can also be used for detecting the damage. For estimating the damage size the phase shift associated with the L(0,1) mode should be monitored after separating the L(0,1) mode from the L(0,2) mode by considering appropriate intrinsic mode function contributions. FFT, S-Transform and WVD Transform did not show any significant and consistent shift in the frequency and amplitude of the propagating waves for 1.6 mm diameter damage. However, noticeable change in the magnitude of the propagating wave was observed for 3.25 mm and 6.35 mm hole type damage. During in-situ pipe inspection the received signal amplitude drop can be also a result of the deterioration of the bonding between the sensors and the pipe. Therefore, instead of the received signal strength monitoring, it is recommended that the changes in TOF and the signal phase shift should be measured for pipe wall damage detection and monitoring, since these parameters are not affected by the bonding condition between the transducers and the pipe. The results show that it is possible to detect and quantify hole type defects in a pipe by monitoring the TOF variation and phase shifts of the appropriate guided wave modes.

In another example, the change in TOF due to corrosion in reinforcing steel bars was measured. The transient signals for non-corroded and corroded samples are processed using FFT, STFT, CWT, and ST. The TOF information is obtained from the ST and the cross-correlation technique. It was demonstrated that the TOF of the L(0,1) mode shows high sensitivity to the corrosion level in steel bars. FFT, STFT, CWT, and ST show significant changes in the amplitude of the propagating waves. Due to dispersive nature of propagating waves, it is better to use ST instead of FFT, STFT, and CWT for signal analysis. At higher frequencies, ST gives reliable results in the time domain, but some information related to the frequency is lost. Reduction in the amplitude of the recorded signal can be caused by corrosion as well as the deterioration of the mechanical bonding between the sensors and the specimens but such deterioration of bonding does not affect TOF. Therefore, TOF measurement is more reliable for quantitative measurement of corrosion level. L(0,1) mode is found to be very reliable for corrosion detection and monitoring its progress. The corrosion induced TOF variation obtained from the ST and cross-correlation matched well with each other and also closely matched with the theoretical dispersion curves. Calculated dispersion curves helped to identify the propagating guided wave mode used to monitor the corrosion level in reinforcing steel bars.

In a related embodiment, non-linear ultrasound testing (characterization/evaluation) can also be used for measuring the strength of material. Materials can be isotropic and anisotropic (metals and non-metals). For example, additive materials within the manufacturing industry, such as the 3D printing industry, can use a combination of virgin powder and used powder which is left over from earlier build. It is known that material properties such as Modulus of Elasticity and density change due to changes in temperature, pressure and other factors. Therefore, structural integrity independent of geometry is directly related to how many times recycled powder can be reused. Similarly, strength of composite materials and concrete (included but not limited to conventional concrete, geopolymer concrete etc.) is also directly related to composition. In case of concrete, aggregate size, curing time, quality of cement, etc. can affect the strength. Accordingly, the strength and reliability of concrete during different stages of curing is successfully detected using non-linear ultrasound testing technique.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A system for determining a weight of a quantity of fluid, the system comprising:
   a vessel having a determinable size, the vessel containing the quantity of fluid;
   an acoustic sensor positioned on an underside, exterior wall of the vessel, wherein the acoustic sensor transmits an acoustic signal into the vessel to determine a fill level of the quantity of fluid in the vessel;
   a temperature sensor sensing a temperature of the quantity of fluid within the vessel; and
   a computerized device in communication with the acoustic sensor and the temperature sensor, wherein a processor of the computerized device calculates a temperature-compensated fluid density of the quantity of fluid based on the sensed temperature of the quantity of fluid and a temperature-compensated acoustic signal,
   wherein the processor of the computerized device calculates a weight of the quantity of fluid using the determinable size of the vessel, the determined fill level, and the sensed temperature, and the temperature-compensated fluid density.

2. The system of claim 1, wherein a fluid identity of the quantity of fluid is determined by an additional acoustic sensor, wherein the additional acoustic sensor is positioned on an exterior wall of the vessel.

3. The system of claim 1, wherein the temperature-compensated fluid density of the quantity of fluid is determined by an additional acoustic sensor, wherein the additional acoustic sensor is positioned on an exterior wall of the vessel.

4. The system of claim 1, wherein the determinable size of the vessel is a volumetric size of the vessel, wherein the volumetric size is determined from a strapping table.

5. The system of claim 1, wherein the vessel has inner and outer walls, and wherein the acoustic sensor is positioned between the inner and outer walls of the vessel.

6. The system of claim 1, wherein the processor of the computerized device calculates the weight of the quantity of fluid at two or more times, wherein a flow rate of the quantity of fluid is determined by the two or more times the weight of the quantity of fluid is calculated.

7. A method for determining a weight of a quantity of fluid, the method comprising the steps of:
   holding the quantity of fluid within a vessel having a determinable size;
   determining a fill level of the quantity of fluid in the vessel with an acoustic signal transmitted into the vessel by an acoustic sensor positioned on an underside, exterior wall of the vessel;
   sensing a temperature of the quantity of fluid within the vessel with a temperature sensor;
   calculating a temperature-compensated fluid density of the quantity of fluid with a processor of a computerized device in communication with the acoustic sensor and the temperature sensor using the sensed temperature of the quantity of fluid and a temperature-compensated acoustic signal; and
   calculating a weight of the quantity of fluid with the processor of the computerized device using the determinable size of the vessel, the determined fill level, the sensed temperature, and a temperature-compensated fluid density.

8. The method of claim 7, further comprising determining at least one of a material type of the quantity of fluid or the temperature-compensated density of the quantity of fluid with an additional acoustic sensor, wherein the additional acoustic sensor is positioned on an exterior wall of the vessel.

9. The method of claim 7, further comprising calculating the weight of the quantity of fluid at two or more times, and determining a flow rate of the quantity of fluid based on the two or more times the weight of the quantity of fluid is calculated.

10. The method of claim 7, wherein the vessel further comprises a pipe, and whereby a flow rate of the quantity of fluid through the pipe is determined by:
    positioning a first acoustic sensor on an exterior wall of the pipe at a first location;
    positioning a second acoustic sensor on the exterior wall of the pipe at a second location, wherein the second location is different from the first location, and wherein a distance between the first and second locations is determinable;
    sensing a temperature of the quantity of fluid within the pipe with a temperature sensor; and
    calculating a differential time of flight of the quantity of fluid based on readings of the first and second acoustic sensors, the sensed temperature of the quantity of fluid, a volume of the pipe, and at least one of a fluid identity or a fluid density using the processor of the computerized device which is in communication with at least the first and second acoustic sensors and the temperature sensor, whereby a flow by weight of the quantity of fluid in the pipe is determined.

11. The method of claim 10, wherein calculating the differential time of flight of the quantity of fluid is based on readings of the first and second acoustic sensors in both directions along a flow of the pipe.

12. The method of claim 10, wherein calculating the differential time of flight of the quantity of fluid further comprises measuring a time of flight in one direction and comparing it to a calculated time of flight based on an acoustic wave velocity of the quantity of fluid in a stationary state.

13. The method of claim 10, wherein the velocity flow rate of the quantity of fluid is determined in substantially real-time.

* * * * *